United States Patent [19]

Emery et al.

[11] 4,014,640
[45] Mar. 29, 1977

[54] PIPE BELLING AND CHAMFERING MACHINE

[75] Inventors: Vernon V. Emery, Sun Valley; Charles W. Howe, Pasadena; Joseph Marcella, Sun Valley, all of Calif.

[73] Assignee: Vern Emery Company, Inc., Pacoima, Calif.

[22] Filed: Oct. 16, 1975

[21] Appl. No.: 622,814

Related U.S. Application Data

[62] Division of Ser. No. 62,100, Aug. 7, 1970, Pat. No. 3,923,443.

[52] U.S. Cl. .............................. 432/10; 432/225; 432/227
[51] Int. Cl.² ..................... F27D 5/00; F24J 3/00
[58] Field of Search .......... 432/225, 226, 227, 231, 432/10

[56] References Cited

UNITED STATES PATENTS

| 2,269,595 | 1/1942 | Miller | 432/152 X |
| 2,391,339 | 12/1945 | Pearson | 432/152 |
| 3,082,760 | 3/1963 | Jaeger | 432/226 |
| 3,466,020 | 9/1969 | Blinne | 432/225 |

*Primary Examiner*—John J. Camby
*Attorney, Agent, or Firm*—William H. Pavitt, Jr.

[57] ABSTRACT

A machine for removing a precut length of plastic pipe from an extrusion line, providing a bell on one end thereof, and providing a chamfer on the opposite end thereof. The pipe is received in a V-shaped trough along which it is longitudinally moved as it is delivered from the extruder. At predetermined intervals, a plurality of hydraulic pushers are actuated to move the pipe laterally from the trough onto a conveyor. The conveyor is indexed to a first position in which the axial location of the pipe is corrected and the end to be belled is heated. In a predetermined sequence of events, the conveyor is then indexed to a second position in which a belling plug is inserted into the heated end of the pipe; simultaneously, the opposite end of the pipe may be provided with an internal or external chamfer. When the conveyor is again indexed, the pipe is deposited onto a suitable system so that it may be conveyed to a shipping point.

3 Claims, 9 Drawing Figures

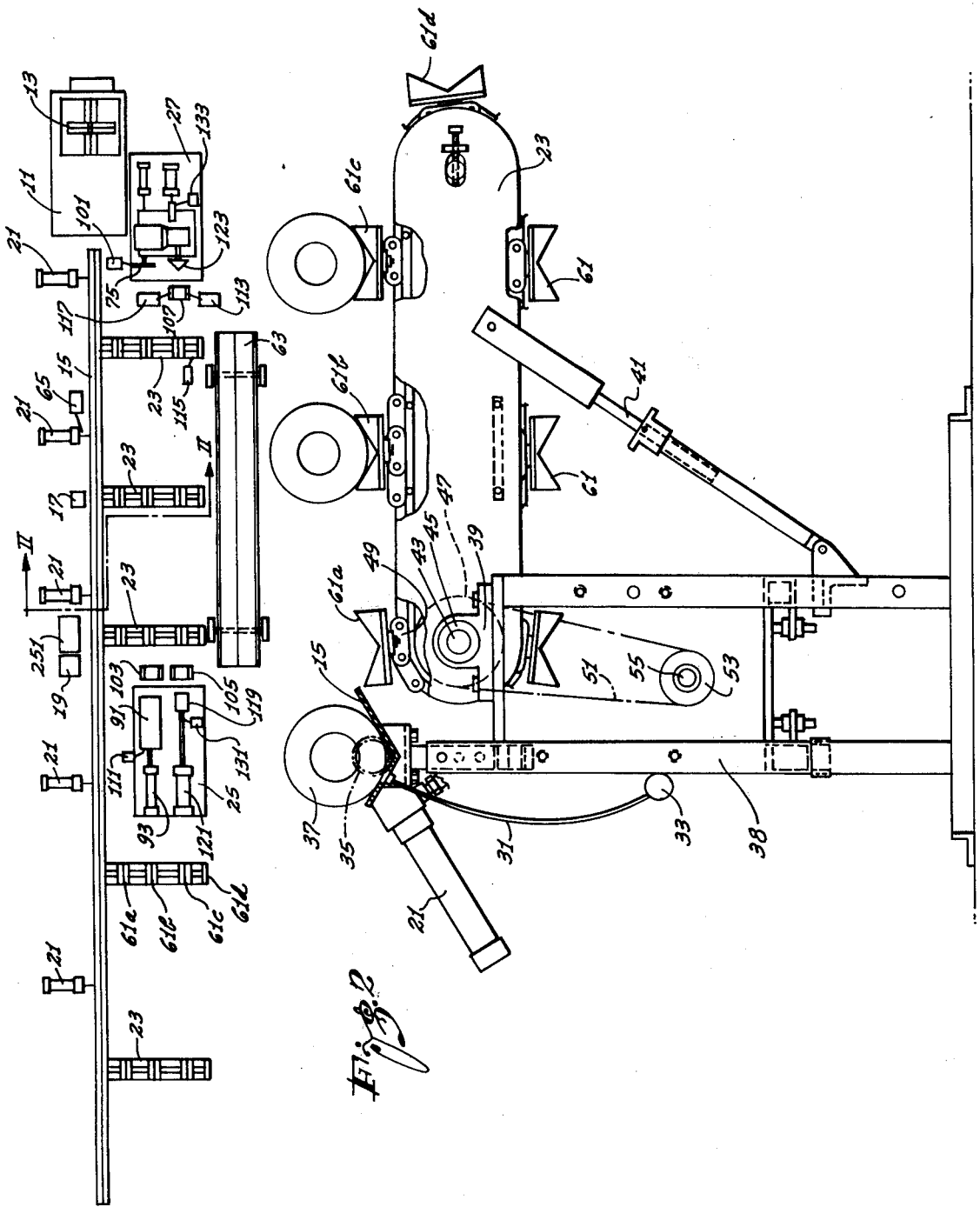

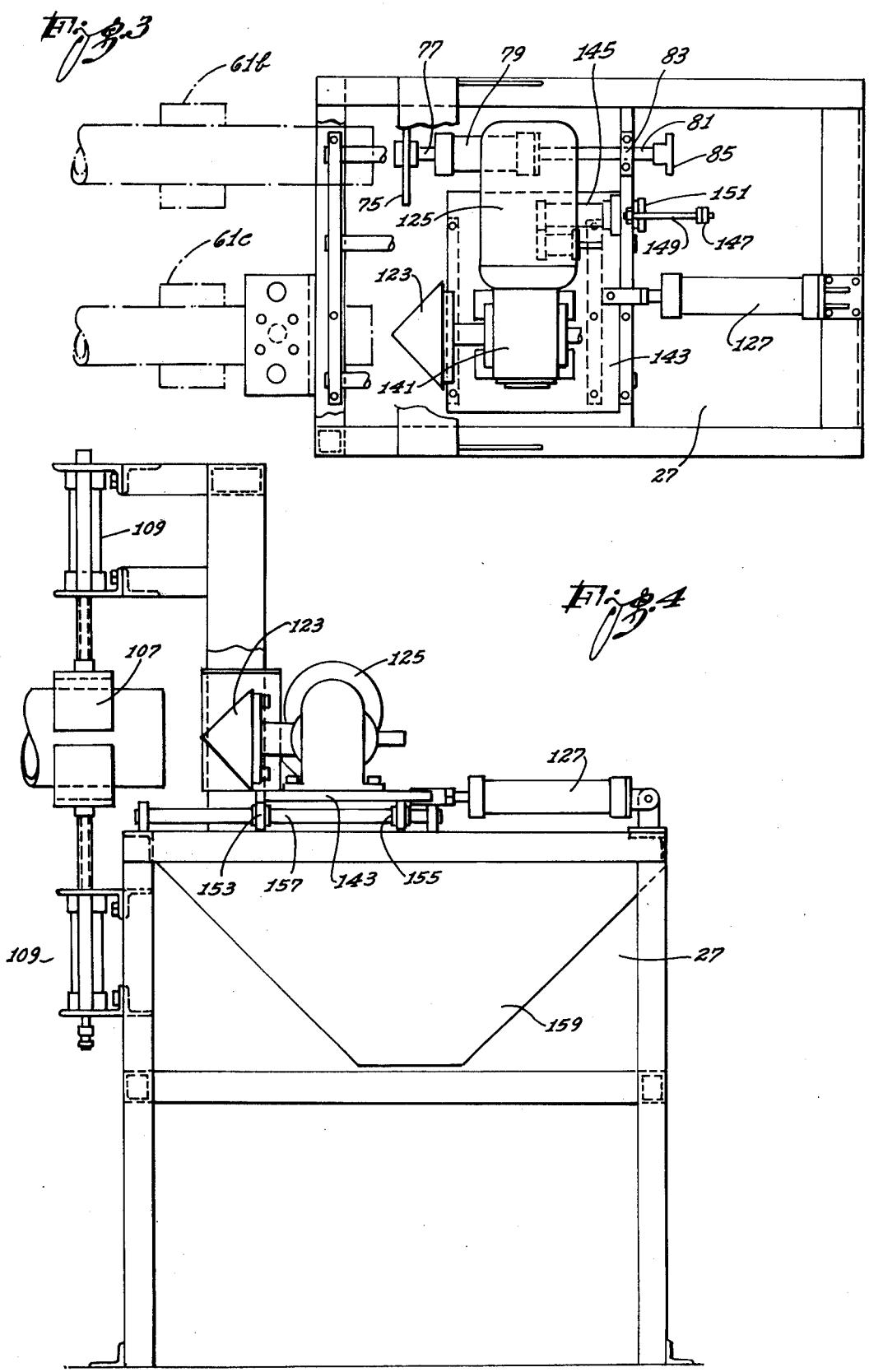

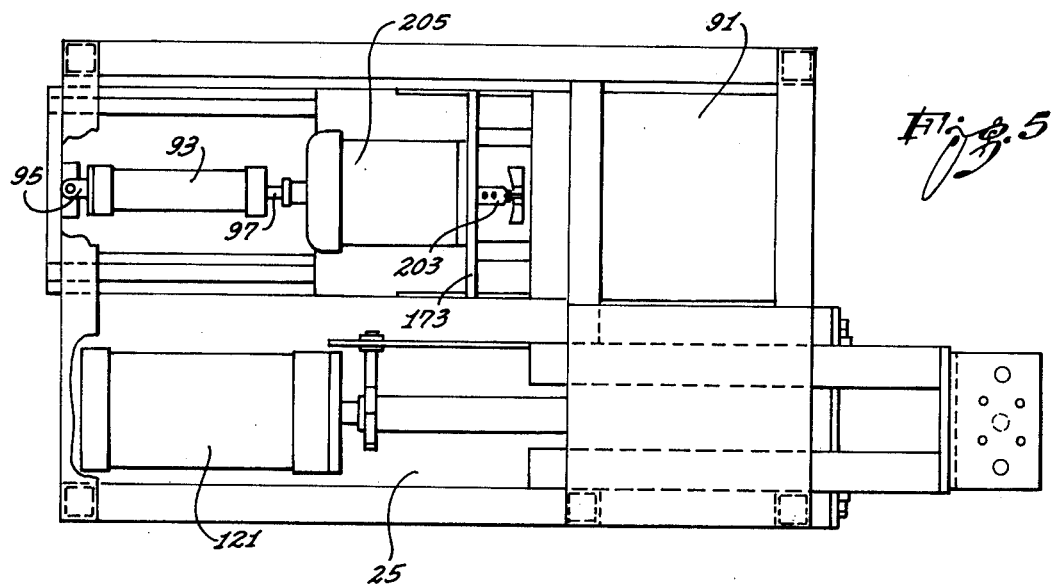
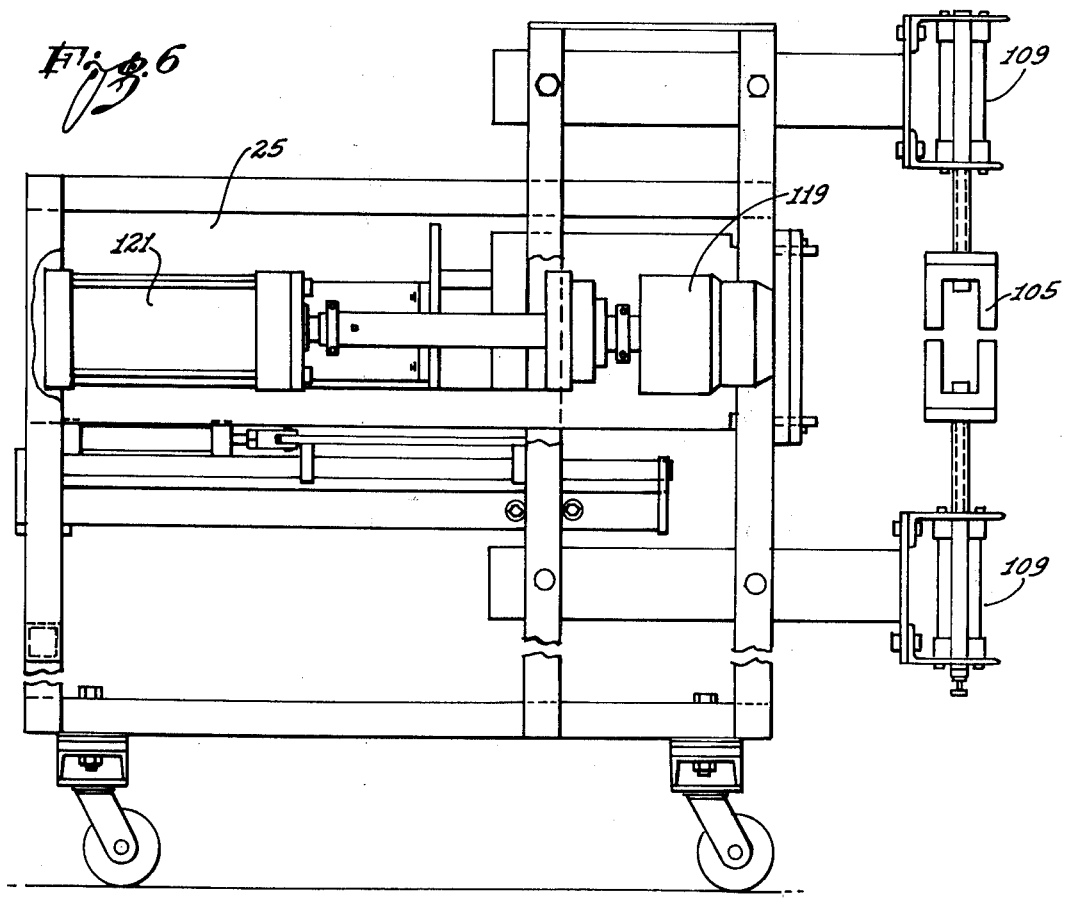

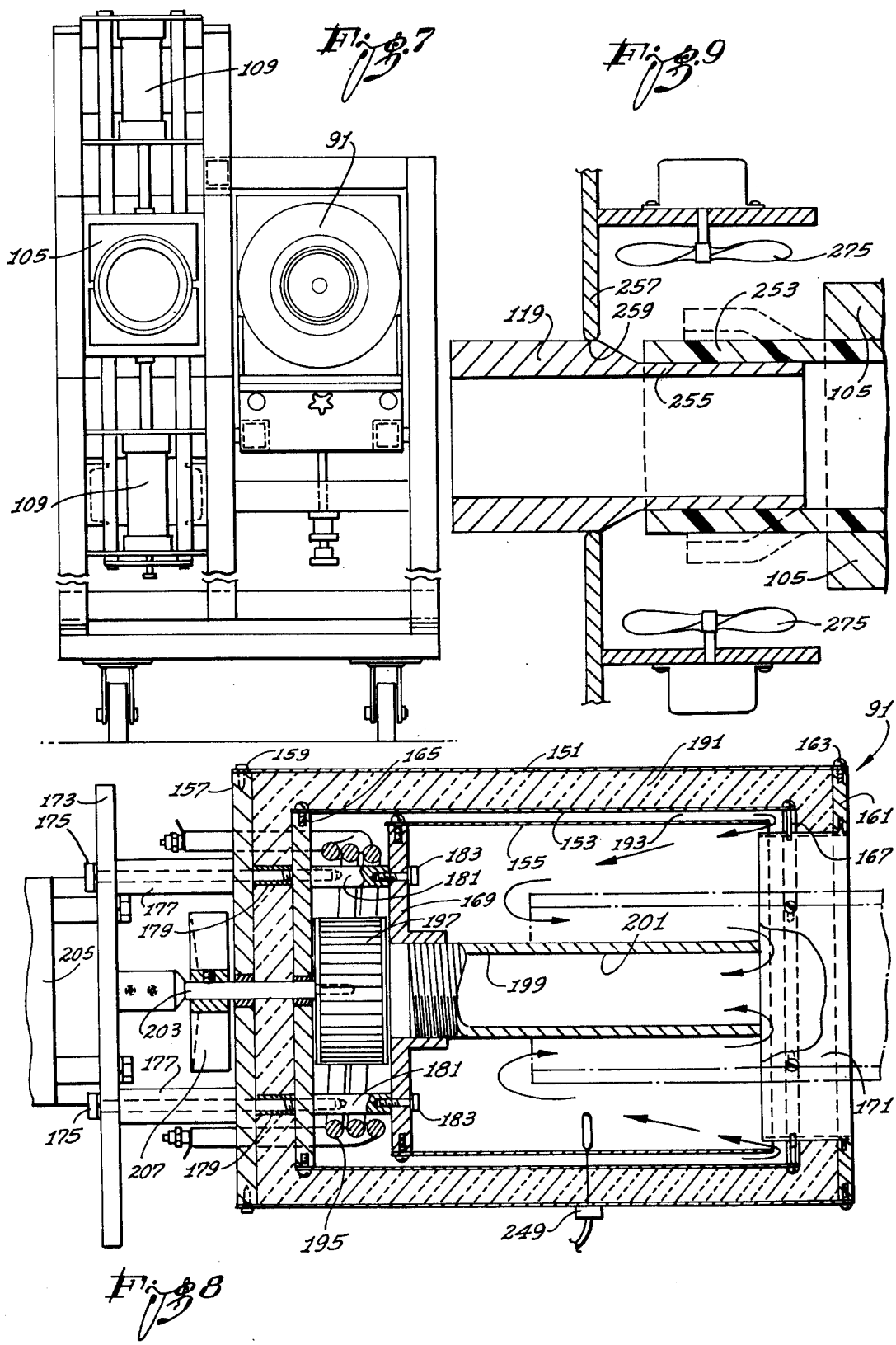

PIPE BELLING AND CHAMFERING MACHINE

This is a division of application Ser. No. 62,100, filed Aug. 7, 1970, now U.S. Pat. No. 3,923,443.

BACKGROUND OF THE INVENTION

Recent improvements in construction materials and techniques have given rise to the widespread usage of plastic piping. Such piping has proven to be especially useful as conduit for the protection of undergrounded electrical wiring, as drain pipe, etc.

In many applications, such pipe is formed in predetermined lengths and placed end-to-end in a trench and a connector is placed over the ends so as to join the pipes together.

In a large number of applications, on the other hand, the adjacent pipe lengths may be joined by slipping the end of one length into the end of the adjoining length. This can be accomplished if the adjoining length is formed with an enlarged or belled end of such a size as to receive the end of the first length.

In the past, the provision of a belled end on a length of plastic pipe was a time consuming, cumbersome, and costly operation since each individual length of pipe had to be manually moved from the pipe extruder to a heater and then to a belling machine. Thus, a workman had to be in position to maneuver each piece of pipe throughout the operation.

Recently, machinery has been developed to eliminate the handling of the individual pipe lengths during the operation. However, this machinery is manufactured with the various elements in fixed relation to one another, so that it is very difficult to adjust the machine for the production of different finished lengths of pipe.

As a major disadvantage of these machines, only one piece of pipe length can be handled at a time and, when that time span is completed, the piece of pipe is dumped from the machine, whether or not the operation is completed. As a result, the timing of each of the operations conducted by the machine is extremely critical and little or no leeway is available.

Also in these machines, a heater mandrel is provided which extends into the pipe and heat band is positioned above the exterior of the pipe so as to soften it for belling. When pipe diameter is to be changed, the heater coils on the inside and outside of the pipe must be disconnected and a new set installed. Since the clearance between the internal heating mandrel and the pipe is necessarily small in these machines, the clamping units which hold the pipe in place during heating often cause it to come into contact with the internal mandrel, resulting in burning the internal surface of the pipe wall.

In summary, when finished lengths of plastic pipe were to be belled and otherwise suitably prepared for use, in accordance with the teachings of the prior art, each length of pipe had to be physically moved and handled by a laborer between the operating stations, or a machine had to be used which was difficult to adjust for various lengths and diameters of pipe, was subject to a critical timing factor, and could easily damage the internal surface of the pipe.

Summary of the Invention

The present invention relates to a new and improved machine which will automatically receive a pipe length severed from an extrusion line, heat an end of the pipe which is to be belled, bell and cool the heated end, and, if desired, chamfer the opposite end of the pipe.

More specifically, the invention relates to such a machine which can easily be adjusted to act upon a large variety of pipe lengths and can be used with nearly any commercially desired pipe diameter.

Basically a machine formed in accordance with the present invention comprises a trough into which the extruded pipe is moved by the extruder. When a predetermined length of pipe is present in the trough, a cut-off saw is actuated to sever it from the following section of pipe which is moving from the extruder. The following section continues to push the cut off section until a series of pushers are actuated to move the cut-off length laterally.

The lateral movement of the pipe causes it to be positioned on a plurality of sections of a stepping conveyor for delivery to a pair of work stations. In the first work station, the longitudinal position of the pipe is corrected by pushing against a first end thereof and the second end of the pipe which is to be belled, is heated. When these actions have been completed, the stepping conveyor is indexed to position the pipe in the second work station.

In the second work station, the heated second end of the pipe length is acted upon by a belling mandrel and is cooled so as to prevent deformation of the pipe while it is still soft.

If desired, when the pipe is in the second work station, its first end may be provided with an internal or external chamfer or, if desired, it may also be belled in a similar process. In other words, if the pipe is to be used in a drain line, the external surface might be provided with a chamfer so that it will slide snugly into the belled end of a pipe to which it is to be attached. On the other hand, if the pipe is to be used as protection for electrical cable, the internal surface may be chamfered to prevent the cable insulation jacket from being frayed, torn, and/or broken as it is being drawn through the pipe.

The heating and belling devices are mounted on a single unit and the pipe positioning apparatus and the beveling tool are also mounted on a single unit. This modular construction of the machine allows the unit to be easily and quickly positioned relative to one another at various positions alongside the trough and at opposite ends of the sections of the stepping conveyor.

The stepping conveyor sections are actuated simultaneously according to a predetermined timing sequence so that a plurality of pipe lengths may be acted upon by the machine simultaneously and the time required for any single operation is not critical. Thus, a relatively large leeway between the completion of one operation and the commencement of the next exists.

The heater assembly generally comprises three concentric tubes in which air is heated and recirculated. The volume between the outer two tubes is filled with insulation and the pipe to be heated is positioned within the inner tube. Heated air is passed between the central and inner tube by a fan so that its flow path crosses the external surface of the pipe end. A mandrel is also positioned within the inner tube so that it extends a predetermined distance into the pipe end and an axial passage in the mandrel is connected to the suction side of the fan. Therefore, when the air is drawn across the outer surface of the pipe length, the fan causes it to be drawn around the end and into the internal bore of the pipe; the air then travels down the pipe until it is once again turned and pulled into the axial passage in the mandrel by the fan. This structure results in a highly efficient heating unit since the pipe end acts, together with the tubes, to prevent the heated air from escaping from the heater.

In other words, air within the heater is circulated about the outer and inner surfaces of the wall of the pipe and is then drawn back into the heater for recirculation. The structure serves to heat the pipe end in a highly efficient manner while preventing any possible damage thereto since there is no possible contact with heating elements.

This invention, together with its further objects, advantages, modes, and embodiments may be understood by those skilled in the art by reference to the Detailed Description and accompanying drawings which illustrate what is presently considered to be a preferred embodiment of the best mode contemplated for utilizing the novel principles which are set forth in the claims.

BRIEF DESCRIPTION OF THE DRAWINGS

FIG. 1 is a top schematic illustration of the positions into which the various components of the machine may be placed relative to one another;

FIG. 2 is a sectional view of the machine illustrated in FIG. 1, as taken along a line II—II therein;

FIG. 3 is a partial top plan view of the unit for positioning and beveling the pipe end;

FIG. 4 is a front view of the unit shown in FIG. 3;

FIGS. 5, 6, and 7 show top plan, front elevation, and right side elevation views, respectively, of the machinery unit utilized for heating and belling a pipe length;

FIG. 8 comprises a partial sectional illustration of the pipe heating unit as seen substantially along the axis thereof; and FIG. 9 comprises an axial sectional view of the pipe belling unit prior to commencement of the end-belling operation.

DETAILED DESCRIPTION

As a continuous length of pipe is drawn from an extruder (not shown) by a puller (not shown), it is pushed by the puller across the table 11 of a traveling cut-off saw 13. As it crosses table 11, it is deposited onto a V-trough 15 which will hereafter be referred to as dump table.

As the leading end of the pipe moves along the dump table from right to left, as seen in FIG. 1, it contacts the actuator arm of a limit switch 17 which may be set along the length of the dump table in any predetermined position. Operation of the switch 17 by movement of its actuator arm causes the cut-off saw 13 to sever the length of pipe in a well-known manner. In this way, the leading section of the continuously extruded pipe is cut off at a predetermined length. When the cut-off has been completed, the severed length continues to move from right to left along the dump table due to the pushing action exerted by the continuous length which follows it.

As the severed length travels further along the dump table, its leading end contacts the actuator arm of a second limit switch 19. When this occurs, a plurality of hydraulic cylinders 21, which are spaced along and positioned behind the dump table, are actuated. These cylinders may be either oil or air operated. In operation, a piston rod extends from each of the cylinders and pushes the pipe length off the dump table and onto a plurality of sections 23 of a stepping or indexing conveyor.

The conveyor sections extend forward from the dump table so as to sequentially position the pipe length relative to a pair of modular units 25 and 27. These modular units may be positioned as desired along the dump table so as to accomodate a pipe of any length as determined by the positioning of the switch 17. A selected number of conveyor units may be used, as illustrated, to keep the pipe from bending.

Referring now to FIG. 2, it will be seen that the dump table 15 may be provided with a plurality of drain hoses, one of which is shown at 31, so that, in the event a hole occurs in the pipe while it is in the sizing tank, water running down the length of the extruded pipe will settle into the trough of the dump table and be discharged through holes therein into the hoses. Each hose, in turn, discharges into a manifold 33 which may be connected to any suitable plumbing drainage system so that the water is prevented causing a potentially dangerous condition by being discharged onto the factory floor.

As shown in FIG. 2, a wide variety of sizes of pipe in diameter and wall thickness may be handled by the machine, as evidenced by the smaller pipe 35 illustrated in phantom, and the larger pipe 37.

The dump table 15 is supported by a work stand 37 which also serves to support the conveyor sections 23, such as by means of a bearing support 39 and an adjustable brace 41.

A shaft 43 extending the length of table 15, is mounted within a bearing 45 in each of a plurality of bearing supports 39 so that a pulley or sprocket 47 mounted on the shaft 43 can transmit power to a chain sprocket (not shown) to drive a conveyor chain 49 in each conveyor section 23.

Power is delivered to the sprocket 47 by means of a chain 51 which passes over a sprocket 53 on a main drive shaft 55 suitably mounted in the work stand 37. The main drive shaft is powered by any suitable means such as a motor (not shown) which is actuated at predetermined intervals so as to drive the conveyor sections a short distance at a time. A plurality of pipe carriers 61 are mounted at suitable intervals on each of the chains 49 so that when the chains are stopped, a pipe carrier 61a is positioned in a pipe-receiving station immediately adjacent the forward lip of the dump table 15 to receive a pipe from the table when the cylinders 21 are actuated. A carrier 61b and a carrier 61c are shown at first and second work stations, resectively. When the conveyor is indexed so as to move each carrier to the next station, the carrier shown at 61c will move to the position occupied by carrier 61d in FIG. 2. When this occurs, the pipe on that carrier will fall onto a conveyor or some other finished pipe length removal means, such as the cart 63 illustrated in FIG. 1.

Since each conveyor section 23 is attached to the work stand 37 by a pair of bearing supports 39 and the adjustable support 41, the conveyor sections may be added to or deleted from the machine in any desired quantities so that the pipe lengths may be supported between the modular elements 25 and 27 along straight axial lines.

For the purposes of this description, it will be assumed that a length of pipe is already positioned in each of the stations 61a, 61b, and 61c.

When the length of pipe being pushed down the dump table 15 reaches and operates the switch 19, the pushers 21 are actuated to extend so as to push the pipe from the dump table toward the conveyor sections 23.

As the cylinders 21 are actuated, the extension of the pushers therefrom causes the operation of a switch 65 which causes actions to be described to be initiated on elements of both modular sections 25 and 27, so as to perform positioning and heating operations on the pipe in the carriers at position 61b.

Referring now to FIGS. 3 and 4 wherein the modular section 27 has been illustrated in greater detail, a pipe in the carriers at station 61b is in axial alignment with a paddle 75. The operation of the switch 65 acts to cause the paddle to extend toward the upstream end of the pipe (the end nearest the saw) to ensure that the pipe is properly positioned between the modular units 25 and 27.

The paddle 75 is mounted on a piston rod 77 which may be extended from a cylinder 79 when hydraulic power is delivered to the cylinder. The paddle and cylinder may be accurately positioned on the unit 27 by means of a threaded rod 81 which is attached to the rear end of the cylinder. The rod is threaded through a flanged member 83 so that, as a handle 85 fixed on the end of the rod is rotated, the cylinder and the paddle are adjusted toward the left or the right, as viewed in FIG. 3, thereby ensuring that the paddle will always move the pipe length to a precise, predetermined position.

When the paddle 75 reaches its fully extended position, a switch 101 (FIG. 1) is actuated, causing a series of clamps 103, 105, and 107 (FIGS. 1, 4, and 6) to be closed by suitable means such as hydraulic cylinders 109. This causes the pipe lengths in the work stations, i.e., in carriers 61b and 61c, to be fixed in position for completion of the operations being performed upon them.

Referring now to FIGS. 1 and 5, the actuation of the switch 65 also causes a heater element 91, which will be more fully described later, to move over the downstream end of the pipe (the end farthest from the saw 13) in the carriers at 61b. The movement of the heater 91 is accomplished by the actuation of a hydraulic cylinder 93, which is fixed at an end 95 to the unit 25 and has a piston rod 97 attached to the rear end of the heater. The heater is controlled by a timer which governs the time that the heater stays over the pipe so that the heating, and thus the softness of the pipe end, can be closely controlled.

When the heating operation is completed, the cylinder 93 withdraws the heater 91 from the downstream end of the pipe length in station 1 and, as it is withdrawn, a switch 111 (FIG. 1) is actuated. When this switch and a series of other switches, —131 and 133 which will be described later, — are actuated, the clamps 103, 105, and 107 are opened so as to release the pipes in work stations two and three.

As the clamps 107 open, a switch 113 (FIG. 1) is operated, causing the conveyor sections 23 to index the carriers one position. When a carrier reaches and operates a switch 115, the conveyors are stopped. In other words, when the switch 113 is operated due to the opening of the clamps, the conveyors are indexed bringing the positioned and heated pipe from the first work station to the second work station. The pipe which was in the second work station is dropped onto the cart 63. The pipe on the carriers adjacent the dump table, i.e., in the pipe-receiving station, is moved into the first work station so that the positioning and heating of that pipe can commence.

When the conveyors have stopped, the pushers 21 again extend and the cycle again commences.

As the clamps again close, due to the operation of switch 101 as described above, a switch 117 is operated, causing a bell plug 119 on the modular unit 25 (FIG. 6) to extend into the heated pipe under the force of a cylinder 121, expanding its diameter and forcing its softened end to compress slightly. This action results in both a slight reduction in the length of the pipe and an increase in wall thickness in the bell due to the compression force on the pipe. The wall thickness increase compensates for any loss in wall thickness which might otherwise occur due to the radial expansion of the pipe end.

Referring now to FIG. 9, a length of pipe 253 has been shown clamped in place by the clamps 105. The belling mandrel 119 has an extension 255 thereon which acts as a positioning mandrel so that as the mandrels are extended by the cylinder 121 into the pipe 253, the positioning mandrel will prevent the formation of wrinkles or bends in the wall of the pipe in the area adjacent the bell. These mandrels may be formed as a single element as shown or may be movable relative to one another, if desired, so as to limit the travel of the positioning mandrel into the pipe. If desired, one or more cooling fans 275, driven by motors 277, may be positioned to force cooling air about the newly formed bell. This will allow the bell to be stabilized prior to moving the pipe length or dumping it onto the cart 63, which might otherwise cause the bell to be deformed while still hot.

When the belling of the pipe is completed, the mandrels are withdrawn through a stripping plate 257 which has an aperture 259 theerein in close clearance with the external surface of the belling mandrel. If the pipe 253 should slip through the clamps 105 and 107, it will be prevented from further movement by contact with the stripper plate 257. As the mandrels are withdrawn, switch 131 is actuated as described above.

When the switch 117 is operated by the closing of the clamp 107, a chamfer or bevel cutter 123 (FIG. 3), driven by a motor 125, may be moved into the upstream end of the pipe by a hydraulic cylinder 127. The cutter 123 illustrated in the drawings may be utilized to provide an internal chamfer on the pipe so that the pipe may be used as an electrical conduit as described previously. If desired, the cutter 123 could be replaced with a cutter which would chamfer the pipe externally.

As the belling tool 119 retracts, it actuates a switch 131 and as the bevel cutter 123 retracts, it actuates a switch 133. These switches are in series with switch 111 so that all three operations must be completed before the clamps can be opened as described previously.

Referring once again to FIGS. 3 and 4, it can be seen that the bevel cutter 123, its motor 125, and the interconnecting drive structure 141 are mounted on a plate 143 for movement by the cylinder 127. The travel of the plate is limited by a feed control element 145 having a knob 147 adjustably mounted on a rod 149. When the limit of travel of the plate 143 has been reached, the knob 147 contacts a striker 151 to prevent further movement. A plurality of flanges 153 extend from the lower surface of the plate and contain bushings 155 which ride along shafts 157 to guide the movement of the plate. A hopper 159 may be provided on the modular unit 27 to receive the chips and shavings which are generated by the beveling of the pipe end.

The details of a preferred embodiment of a heating unit 91 are clearly illustrated in FIG. 8. As shown, the heater comprises an outer tube 151, a center tube 153, and an inner tube 155. The outer tube is attached to an outer plate 157 by suitable means such as bolts 159 and to an outer ring 161 by means such as bolts 163. The center tube 153 is similarly attached to a center plate 165 and a center ring 167. The inner tube 155 is similarly attached to an inner plate 169 but is open at its opposite end and spaced from an entry tube 171 which is attached to the rings 161 and 167.

This assembly is supported by a motor mounting plate 173 by bolts 175 which extend through spacers 177 positioned between the motor mounting plate and the outer plate 157. Bolts 175 also extend through spacers 179 positioned between the outer and center plates and are threadably fitted into spacers 181 positioned between the center and inner plates. The inner plate 169 is fastened to the assembly by bolts 183. In this manner, all three tubes are properly spaced and mounted on the motor mounting plate 173.

Insulating material, such as rock wool 191, may be positioned between the outer and center tubes and an air passage 193 is formed between the center and inner tubes as a result of the spaced mounting of the tubes. The air passage 193 extends between the inner and center plates 165 and 169 and heating coils 195 are so positioned that air driven through the air passage 193 by a suction fan 197 is passed over them.

Heating mandrel 199, having an inner bore 201 extending throughout the length thereof, is threadably attached to the inner plate 169 in coaxial relation with the suction fan 197.

The suction fan is mounted on a shaft 203 which extends through bearings in the outer and center plates and is driven by a motor 205. If desired, a multi-bladed fan 207 may be mounted on the shaft 203 to act as a heat exchanger for the shaft and to aid in cooling the structure between the heater and the motor.

In operation, air within the heater is drawn into the heating mandrel bore 201 by the suction fan 197 and is discharged into the passage 193 as it moves across the heater coils 195. The air moves toward the right, as viewed in the drawing, between the inner tube 155 and the center tube 153 and is turned approximately 180° in the opening between the inner tube and the entry tube 171. The heated air then passes to the left over the outer surface of a pipe end positioned within the heater, is turned 180° around the leading end of the pipe, is drawn to the right along the inside of the pipe wall, and is then drawn to the left again into the bore 201 for reheating and recirculation by the fan 197.

With structure in the nature of that described, a pipe end positioned within the heater is well removed from the heating coils so that damage to the pipe by contact therewith is absolutely prevented. Further, testing has shown that very little of the heated air leaves the heater through the entry tube 171 so that the recirculation system creates a high efficiency level for the system. The heating coil 195 and suction fan 197 are, of course, operated only during the time that heater 91 is moved over the pipe end. Therefore, the configuration of the heater structure is such as to cause the pipe end to form a major portion of the air flow path to ensure (a) high efficiency of usage of the heated air, (b) a minimum of hot air loss through the entry tube 171, and (c) a minimum of cool air entry through that tube.

If desired, a temperature sensing unit such as 249 may be mounted within the heater to limit and control the maximum temperature applied to the pipe by power to be delivered to or shut off from coil 195.

As shown in FIG. 1, a main control panel 251 may be positioned relative to the machine for providing power and timing circuits for the machinery.

In summarizing the operation, when the extruded pipe is pushed along the dump table 15, it actuates a switch 17 so as to cause a saw 13 to operate and sever the pipe. The severed length then actuates a switch 19 as it moves down the table and the pipe is pushed from the dump table 15 onto the conveyor sections 23 at the receiving station 61a. When the conveyor sections are indexed to the first work station 61b, the pipe is longitudinally positioned by the paddle 75 and heated by the heater 91. When the conveyor sections are again indexed to the second work station 61c, the upstream end of the pipe length is beveled by the tool 123 and the downstream or heated end is belled by the belling plug 119.

When all of the clamps have opened and switch 113 is actuated, the conveyor sections will index one step to move the carriers to position 61d and the parts will remain motionless until the pushers 21 are again extended, actuating the switch 65.

Although the machine has been shown as being provided with a belling unit on one end and the chamfering unit on the opposite end, it should be realized that due to the modular construction, any suitable arrangement of the parts can be made including belling or chamfering both ends of the pipe simultaneously. With the structure provided, any suitable pipe length can be handled merely by repositioning the modular units and the limit switches along the dump table. When it is desired to alter the machine to handle a different pipe diameter, under normal circumstances only the belling plug must be changed. If the pipe diameter changes radically, it may be necessary to change the size of the bevel cutter and the heater mandrel but these are simple operations which require a minimum of time. Additionally, structure has been provided to easily adjust the travel limits of the bevel cutter and the positioning paddle.

Thus, a machine is provided which will perform several operations on a pipe without requiring handling by an operator. In fact, if a cart is used for removal of the pipes, a single operator can control two machines and his primary function will be to remove and replace the carts. The simplicity of the heater practically eliminates the relative bulk of structure which has been utilized in the past, increases efficiency, and makes burning of the pipe end impossible.

The applicants have provided an embodiment of a new and improved concept in the pipe forming art which yields a true advancement in that art. Many modifications and other embodiments of the invention will be obvious to those skilled in the art without exceeding the scope of the invention which is defined in the following claims, wherefore,

We claim:

1. The method of heating an end of a length of pipe to be belled comprising the steps of
passing air from the exhaust side of a fan across heating coils,
heating the air as it crosses the heating coils, passing the heated air over the outer surface of the wall of an end of the length of pipe, turning the heated air as it flows past the end of the length of pipe, passing the heated air over the inner surface of the wall of the end of the length of pipe, and returning the heated air to the suction side of the fan.

2. Apparatus for heating the end of a plastic pipe, said apparatus comprising:

a. a housing, said housing including a wall defining a cylindrical chamber, and a radially inwardly extending partial wall at one end thereof, the inner edge of said partial wall defining a plastic pipe end receiving opening;

b. wall means closing the opposite end of said thus-defined cylindrical chamber;

c. a transverse wall fixedly secured in said chamber, said transverse wall being disposed toward, but spaced from, said wall means, and at least partially peripherally spaced from the housing wall defining the cylindrical chamber; said transverse wall being centrally orificed and carrying from about said central orifice, pipe means extending coaxially into said chamber oppositely from said wall means toward said pipe end receiving opening; and said transverse wall further carrying radially outwardly of said pipe means a coaxial cylindrical sleeve, said sleeve extending both toward said partial wall and being spaced from said pipe means and the wall defining the cylindrical chamber to provide air flow passages through each of said spacings;

d. rotary blower means, said blower means being disposed in the spacing between said wall means and said transverse wall, said blower means having its inlet adjacent the central orifice in the transverse wall and blowing air radially outwardly in said spacing between the wall means and the transverse wall in an air flow path initially toward the wall defining the cylindrical chamber for deflection into the passage defined by said housing wall and said sleeve, for further deflection by said partial wall back into the passage between said sleeve and said pipe means from which the air may be sucked first into the end of any plastic pipe inserted into said plastic pipe end receiving opening and then back into the pipe means to return to the blower inlet; and, e. heater means disposed in said air flow path.

3. The apparatus as defined in claim 2, wherein the heater means is disposed radially outwardly of the blower means in the spacing between the wall means and the transverse wall.

* * * * *